United States Patent [19]

Ruch et al.

[11] Patent Number: 4,490,443

[45] Date of Patent: Dec. 25, 1984

[54] BATTERY HAVING ELECTROLYTE SUPPLY RESERVOIR AND ACTIVATION TANK DISPOSED IN A BATTERY HOUSING

[75] Inventors: Jean Ruch; Detlef Katryniok, both of Brilon, Fed. Rep. of Germany

[73] Assignee: Accumulatorenwerke Hoppecke Carl Zoellner & Sohn GmbH & Co. KG, Brilon, Fed. Rep. of Germany

[21] Appl. No.: 544,604

[22] Filed: Oct. 24, 1983

[30] Foreign Application Priority Data

Oct. 25, 1982 [DE] Fed. Rep. of Germany ....... 3239396

[51] Int. Cl.$^3$ .......................................... H01M 12/06
[52] U.S. Cl. ....................................... 429/27; 429/34; 429/70; 429/72; 429/81
[58] Field of Search ....................... 429/27, 34, 70, 72, 429/80, 81, 51, 52, 14, 113, 118

[56] References Cited

U.S. PATENT DOCUMENTS

| | | | |
|---|---|---|---|
| 3,343,994 | 9/1967 | Stanimirovitch | 429/52 |
| 3,758,342 | 9/1973 | Baba | 429/27 X |
| 3,806,370 | 4/1974 | Nischik | 429/34 X |
| 3,928,078 | 12/1975 | Kothe et al. | 429/81 |
| 3,993,502 | 11/1976 | Bjorkman, Jr. | 429/51 |

Primary Examiner—Anthony Skapars
Attorney, Agent, or Firm—Becker & Becker, Inc.

[57] ABSTRACT

A battery which makes possible a long-time operation under high load. The battery is made of a plurality of galvanic elements, especially metal-air-cells, each of which comprises a consumable metal electrode of planar shape which extends into a receptacle which is flushed with electrolyte. The sidewalls of the receptacle can be flushed free of air or oxygen. Each of the receptacles supports at least one gas diffusion electrode at a distance from the working surface of the consumable metal electrodes. In order to provide a battery which can be stored without restriction due to activation and deactivation, and which permits a rapid mechanical recharging independent of the electric circuit, a supply reservoir for the electrolyte is disposed in a housing below at least one cell unit. The supply reservoir is connected via a closure member with an electrolyte activation tank which is disposed at least partially above the working level of the electrolyte in the cells. Each cell receptacle can receive electrolyte from the supply reservoir via a pump and branch lines. The electrolyte can be circulated via this pump. By opening the closure member, the cell unit can be activated and deactivated as needed.

7 Claims, 2 Drawing Figures

BATTERY HAVING ELECTROLYTE SUPPLY RESERVOIR AND ACTIVATION TANK DISPOSED IN A BATTERY HOUSING

BACKGROUND OF THE INVENTION

The present invention relates to a battery made of a plurality of galvanic elements, especially metal-air-cells, each of which comprises a consumable metal electrode of planar shape which extends into a receptacle which is flushed with electrolyte. The side walls of the receptacle are flushed free of air or oxygen. Each of the receptacles supports at least one gas diffusion electrode at a distance to the working surface on the consumable metal electrodes.

A flat cell of this type, which is suitable for having several grouped together to form a battery, is known from German patent application No. P 31 29 248.8. The aluminum-air-cell described in that application comprises an anode, which represents a consumable aluminum electrode of planar, rectangular shape, a receptacle for receiving an alkaline electrolyte, especially KOH, as well as two gas diffusion electrodes which are in the form of air electrodes and which are disposed on the flat sides of the receptacle opposite one another. Such aluminum-atmospheric oxygen cells belong to a new generation of activatable primary batteries in which, by replacing the anode and the electrolyte, a "recharging" is effected. During the discharge process, the aluminum metal reacts with the oxygen from the air or from a carried-along supply, and is dissolved in the alkaline electrolyte.

It is an object of the present invention, while utilizing the known cells, to develop a battery which makes possible a long-time operation under high load, which can be stored without restriction due to activation and deactivation, which makes possible a rapid recharging, independent of the electric circuit, by replacing the aluminum and electrolyte working materials, and which has a high energy capacity at a high power density.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
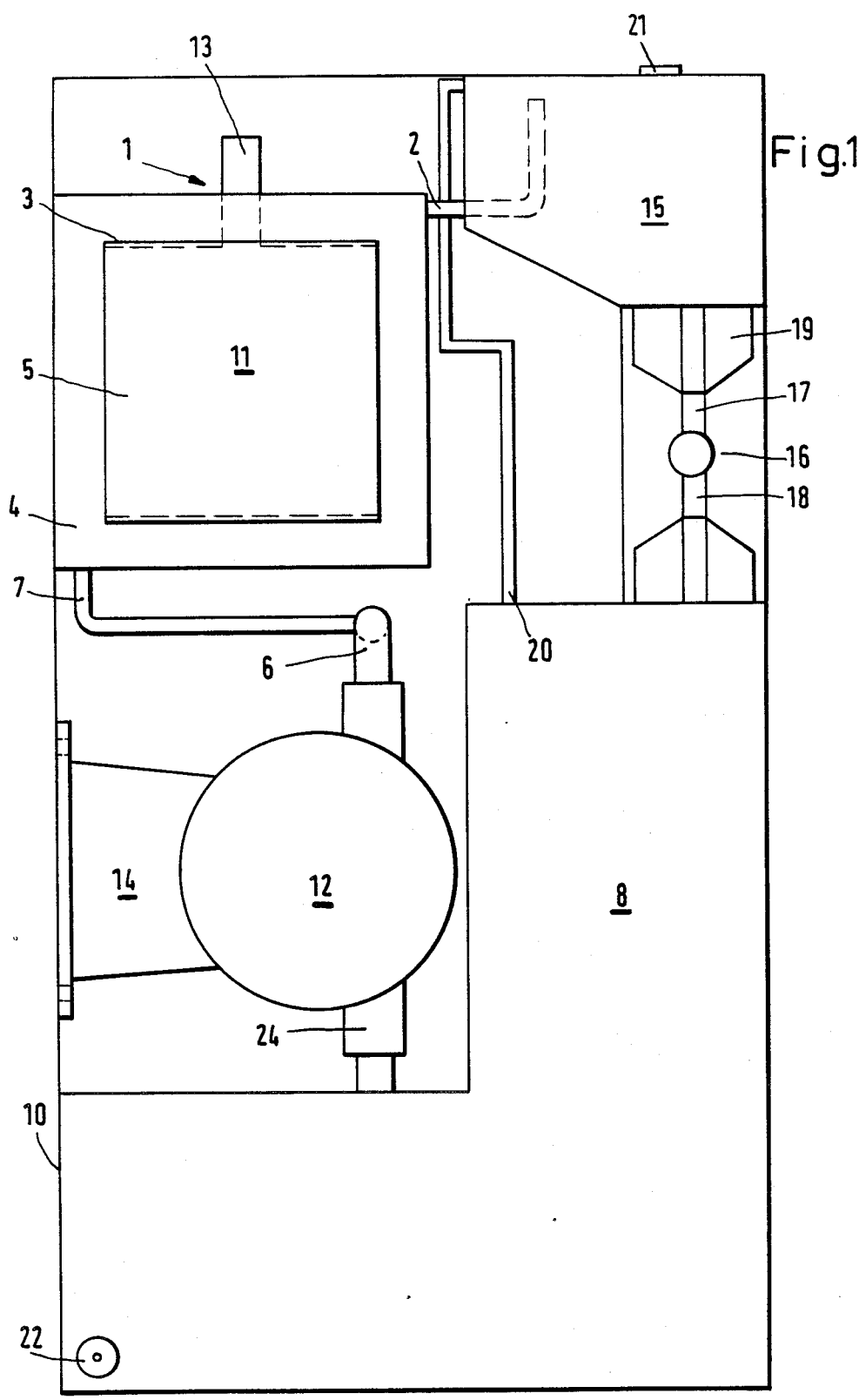
FIG. 1 is a schematic side view of one embodiment of the inventive battery.

The battery of the present invention is characterized primarily in that a supply reservoir for the electrolyte is disposed in a housing below at least one cell unit. The supply reservoir is connected via a closure member with an electrolyte activation tank which is disposed at least partially above the working level of the electrolyte in the cells. The battery of the present invention is further characterized in that each cell receptacle can receive electrolyte from the supply reservoir via a pump and branch lines; the electrolyte can be circulated via the pump. With such a pump is possible to first purely hydrostatically activate and deactivate the cell unit as needed by opening the closure member. Preferably, the closure member is an electrical control valve by means of which the pump, especially a centrifugal pump, can be electrically connected to the cell unit in such a way that during an activation, the current generated in the cell unit can be used to drive or set in operation the pump and hence for automatic circulation of the electrolyte.

Furthermore, to intensify the supply of air, it can be advantageous to install a fan on one of the walls of the housing adjacent to the cell unit; the fan can similarly be electrically connected to the cell unit, for example via the control valve.

Pursuant to one expedient specific embodiment of the present invention, an electrolyte supply line can be centrally disposed in the housing of the battery, and can extend over the entire width. The branch lines can branch off from this supply line, and the latter can be the supporting element for an aluminum-air-cell unit having twelve flat cells connected in series. Each flat cell can comprise a receptacle of a metal which is resistant to electrolyte, especially nickel or high-quality steel for alkaline electrolytes, which can be provided with a current tap. On those flat sides which are opposite the active surfaces of the aluminum electrodes, each receptacle can be provided with window-like apertures into which are inserted respective gas diffusion electrodes which are provided with a non-absorbent insulating coating. Furthermore, an electrolyte delivery tube may be provided at the receptacle and may lead into the activation tank. The outlet is always located above the level of the electrolyte in the activation tank. The individual electrolyte delivery tubes of the cells can also be combined in a single connecting tube.

The battery of the present invention is particularly suitable as a source of current for an emergency power supply, at construction sites, and at all locations where electric supply lines do not exist. The inventive battery is distinguished by a high energy capacity and a high power density. Due to the possibility of activation and deactivation without a restriction on the ability to store the battery, excellent possibilities for application are provided. The inventive concept allows a long-time operation under high load. A rapid recharging independent of the electric circuit is possible by replacing the aluminum and the electrolyte working materials, and the replaced parts, especially the electrolyte after discharge, can be utilized in a recycling operation for producing aluminum.

The electrolyte supply reservoir and the activation tank can comprise a material, such as polypropylene, which is resistant to KOH and can withstand high temperatures up to 80° C. The electrolyte supply reservoir can be connected via a tank ventilator with the activation tank. The tube connections for the electrolyte delivery tubes from all of the flat cells can end above the level of the electrolyte in the activation tank.

DESCRIPTION OF PREFERRED EMBODIMENTS

Referring now to the drawings in detail, FIG. 1 shows a flat cell 11 arranged in the upper half of a housing 10, which can, for example, comprise a non-conductive synthetic material or high-quality steel which is covered with synthetic material; the housing 10 can possibly by provided with perforations for the supply of air. The flat cell 11 is an aluminum air cell, and comprises an anode 1, which constitutes a consumable aluminum electrode of planar, rectangular shape, a receptacle 4 of nickel for receiving an alkaline electrolyte, especially KOH, as well as two gas-diffusion electrodes 5 which are in the form of air-type electrodes and which are disposed on the flat sides of the receptacle 4 opposite one another. The receptacle 4 is essentially a rectangular box, the upper opening of which is sealingly closed off by an electrically insulated cover 3. In the middle, the cover 3 supports the anode 1, on which in one piece is formed a lug 13 as a current tap. FIG. 1 furthermore shows that the left side of the receptacle 4, with reference to the view in the drawing, is connected to the adjacent wall of the housing 10. This connection serves to hold the flat cell in the battery housing. Finally, a tube connection 2 for the electrolyte delivery tube is provided on the housing 4 in the vicinity of the cover 3.

Further details of the described flat cell can be obtained from the aforementioned patent application No. P 31 29 248.8, to which reference is directed for the purpose of avoiding repetition.

Figure 2:
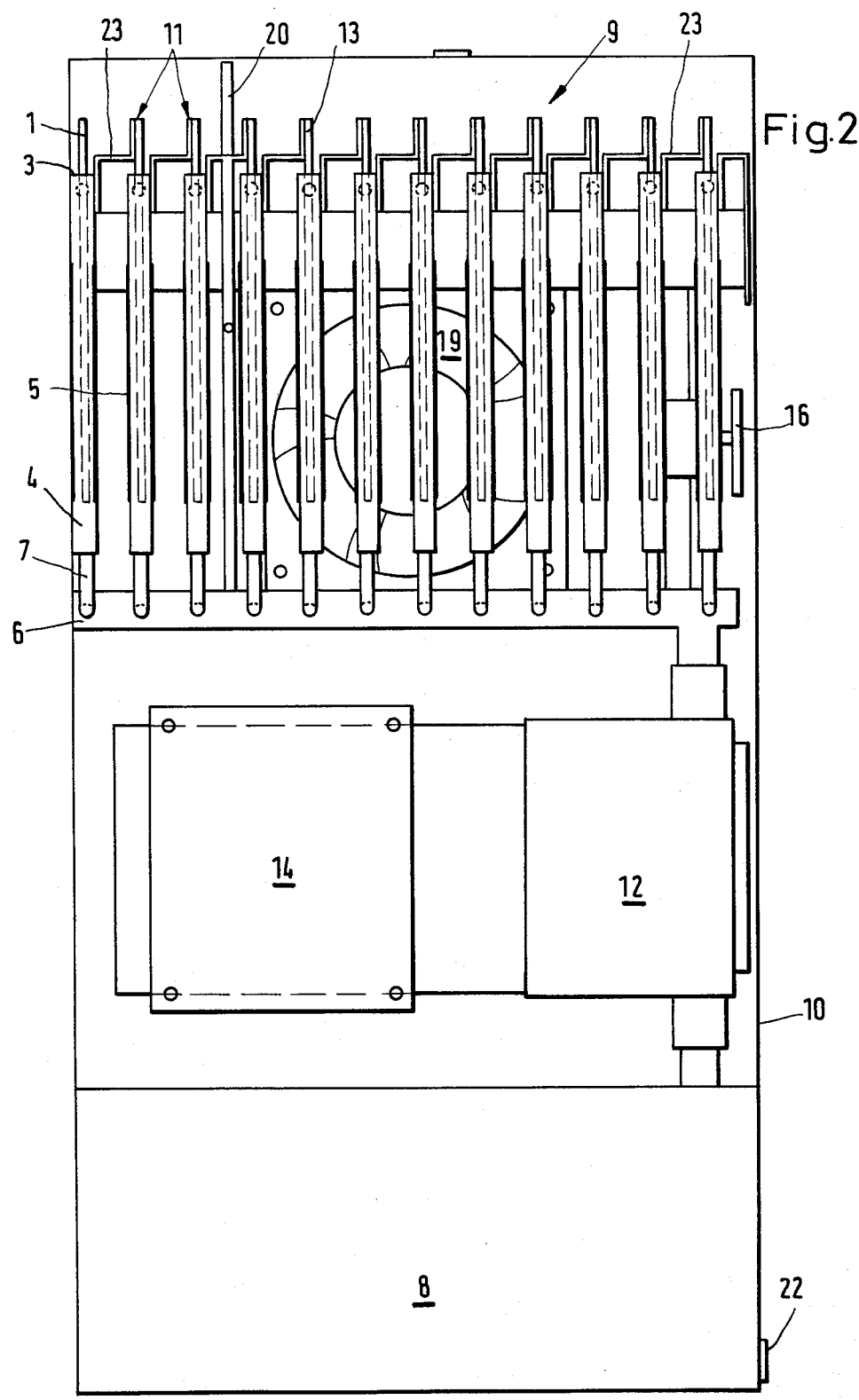
FIG. 2 is a schematic front view of the battery of FIG. 1.

As shown in FIG. 2, a total of twelve flat cells 11 of the aforementioned type are diposed next to one another in the housing 10 and are distributed essentially equidistantly over the front side. To mount the flat cells 11, an electrolyte supply line in the form of a tube 6 is centrally mounted in the housing 10. Individual branch lines 7, in this case a total of twelve branch lines 7, are connected from the tube 6 to the bottom of the pertaining receptacle 4 of the flat cells in order to be able to supply the latter with potassium hydroxide. An electrolyte supply reservoir 8 is disposed in the lower region of the housing 10 for this KOH. The reservoir 8 is connected with the supply line 6 by means of a centrifugal or impeller pump 12 which is disposed below the flat cell unit 9 and is driven by an electric motor 14. The reference numeral 24 designates not only the intake connection but also the pressure connection of the centrifugal pump.

In addition to the electrolyte supply reservoir 8, in the upper right corner of the housing 10 as shown in FIG. 1, an electrolyte-activation tank 15 is provided and is disposed at least partially above the working level of the electrolyte in the cell unit 9.

The activation tank 15 and the electrolyte supply reservoir 8 are connected with one another by means of tubes 17, 18 as well as a valve 16 which is embodied with metal link members and as an electrical controller. There also exists a further connection in the form of a tank ventilator 20 which extends as a tube from the cover plate of the electrolyte supply reservoir 8 to an upper region of the activation tank 15. An electrical switching function takes place simultaneously with the opening and closing of the valve 16. The flat cell unit 9 is electrically connected with the electric motor 14 for the centrifugal pump via the valve 16 in such a way that when the valve is in the open position, current flows through the electric motor. Naturally, all of the elements of the battery are made of material which is resistant to electrolyte and which can also withstand temperatures of up to at least 80° C.

Finally, a fan 19 is disposed within the housing 10. As shown in FIG. 2, this fan serves to intensify the air contact of the gas diffusion electrodes 5 of the cell unit 9. Furthermore, it is to be noted that the tube connections 2 for the electrolyte delivery tube of all of the cells open in the activation tank 15, and in particular above the electrolyte level, as indicated in dashed lines in FIG. 1.

EXAMPLE

An aluminum-atmospheric oxygen battery of the aforementioned type exhibited the following technical data:
Type: 12 DFA 50 A
Capacity (Ah): 80
Discharge time (h): 4
Discharge voltage (v): 12
Mass (kg): 13.2
Dimensions (mm)(l×w×h): 192.182.352
Volume (l): 12.3

For manufacture, the battery and the electrolyte are supplied separately. In order to make the battery serviceable, the electrolyte supply reservoir 8 must first be filled. For this purpose, with the control valve 16 open, the electrolyte is filled by means of a filling opening 21 on the housing 10. The control valve 16 is subsequently closed, whereupon the activation tank 15 is filled. During manufacture, no electrolyte is found in the cell unit 9.

To render the battery operative, it is therefore merely necessary to adjust the control valve 16 in the open position, so that, pursuant to the principle of communicating tubes, the cell unit 9, i.e. all of the individual flat cells, fill purely hydrostatically with electrolyte via the electrolyte supply line 6. The filling must merely be quantitatively sufficient to start the pump by means of the generated current. The opening of the control valve establishes the electrical connection to the pump motor 14, so that current generated in the flat cell unit 9 immediately effects circulation of the electrolyte by means of the centrifugal pump 12. Similarly, the fan 19 is electrically connected with the cell unit 9 via the valve 16, so that the supply of air to the gas diffusion electrodes 5 is also intensified at the same time that current is generated.

The battery can be easily put out of operation by closing the control valve 16. In so doing, the pump motor 14 is switched off and ends the supply of electrolyte via the centrifugal pump. The electrolyte located in the flat cell unit flows downwardly back into the electrolyte supply reservoir 8. In this operating state, there is located in the activation tank at least that quantity of electrolyte which is necessary to again fill the cell unit, via the control valve 16, during reactivation.

For recharging, the used electrolyte is first withdrawn from the tank. For this purpose, the hose or tube of an external draining container is connected to a drain coupling 22 which leads to the supply reservoir 8; after appropriate valves are opened, the electrolyte is withdrawn. Subsequent thereto, the used aluminum electrodes are pulled out of the flat cells at the poles 13, and new anodes are inserted. The spring contact members 23, which are provided for electrical contact, automatically subside again into the contact position due to the spring action.

In the container for new electrodes, the used aluminum electrodes are returned together with the used electrolyte, which is in the separate supply container, and can, for recycling purposes, by used again for the recovery of aluminum.

The present invention is, of course, in no way restricted to the specific disclosure of the specification and drawings, but also encompasses any modifications within the scope of the appended claims.

What we claim is:
1. A battery, comprising:

a housing;

at least one cell unit disposed in said housing; each cell unit includes a plurality of galvanic elements, each of which includes a consumable metal electrode of planar shape, and at least one gas diffusion electrode spaced from the working surface of said metal electrodes; each galvanic element also includes a receptacle into which said metal electrode extends and which supports said at least one gas diffusion electrode; each receptacle can be flushed with electrolyte, and has side walls which are flushed without exposure to air or oxygen;

a supply reservoir for electrolyte, disposed in said housing and, when said battery is in an operating position, below said at least one cell unit;

an electrolyte activation tank disposed in said housing at least partially above the working level of electrolyte in said galvanic elements;

a closure member interposed between said supply reservoir and said electrolyte activation tank for establishing and interrupting communication therebetween;

branch lines leading to each of said receptacles; and a pump associated with said supply reservoir and said branch lines for delivering electrolyte to each of said receptacles, and for circulating electrolyte.

2. A battery according to claim 1, in which said closure member is an electrical control valve by means of which said pump is electrically connected to said at least one cell unit in such a way that upon activation of said battery, current generated in said at least one cell unit can be used to start said pump, and hence can be used for automatic circulation of electrolyte.

3. A battery according to claim 2, which includes a fan associated with said housing adjacent to said at least one cell unit; said fan is also electrically connected with said at least one cell unit via said control valve.

4. A battery according to claim 1, which includes an electrolyte supply line which is centrally disposed in said housing and extends over the entire width thereof; said supply line is interposed between said pump and said branch lines to establish communication therebetween; and in which said at least one cell unit is an aluminum-air-cell unit comprising twelve flat cells which are connected in series; said electrolyte supply line is a support element for said cell unit.

5. A battery according to claim 4, in which each flat cell includes a receptacle which is made of electrolyte-resistant metal and is provided with a current tap; in which said metal electrodes are aluminum electrodes having active surfaces; in which each receptacle has flat sides which are opposite said active surfaces of said aluminum electrode and are provided with window-like apertures, each of which receives one of said gas diffusion electrodes, which are provided with a non-absorbent insulating coating; and in which said receptacles are associated with an electrolyte delivery tube which leads into said activation tank.

6. A battery according to claim 5, which includes a ventilating line which connects said electrolyte supply reservoir with said activation tank; and in which said electrolyte delivery tube from all of said flat cells ends above the level of electrolyte in said activation tank.

7. A battery according to claim 1, in which said electrolyte supply reservoir and said activation tank comprise polypropylene which is resistant to KOH and can withstand temperatures of up to 80° C.

* * * * *